United States Patent
Wang et al.

(10) Patent No.: US 10,651,543 B2
(45) Date of Patent: May 12, 2020

(54) ANTENNA DEVICE AND MOBILE TERMINAL

(71) Applicant: GUANGDONG OPPO MOBILE TELECOMMUNICATIONS CORP., LTD., Dongguan (CN)

(72) Inventors: Xinbao Wang, Dongguan (CN); Ning Zhao, Dongguan (CN); Shengzhao Xiang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/749,047

(22) PCT Filed: Mar. 18, 2017

(86) PCT No.: PCT/CN2017/077163
§ 371 (c)(1),
(2) Date: Jan. 30, 2018

(87) PCT Pub. No.: WO2017/157343
PCT Pub. Date: Sep. 21, 2017

(65) Prior Publication Data
US 2018/0219274 A1    Aug. 2, 2018

(30) Foreign Application Priority Data
Mar. 18, 2016    (CN) .......................... 2016 1 0161254

(51) Int. Cl.
*H01Q 1/24*    (2006.01)
*H01Q 1/38*    (2006.01)
(Continued)

(52) U.S. Cl.
CPC ............... *H01Q 1/243* (2013.01); *H01Q 1/38* (2013.01); *H01Q 1/50* (2013.01); *H01Q 23/00* (2013.01); *H04B 1/48* (2013.01)

(58) Field of Classification Search
CPC ............ H01Q 1/243; H01Q 1/38; H01Q 1/50; H01Q 23/00; H04B 1/48
See application file for complete search history.

(56) References Cited

U.S. PATENT DOCUMENTS

| 2013/0169490 A1* | 7/2013 | Pascolini | ............... H01Q 1/243 343/702 |
| 2017/0149118 A1* | 5/2017 | Wang | ..................... H01Q 1/243 |

FOREIGN PATENT DOCUMENTS

| CA | 2953629 A1 | 10/2015 | |
| CN | 203775569 U * | 3/2014 | ............... H01Q 1/44 |

(Continued)

OTHER PUBLICATIONS

European Patent Application No. 17765885.3, Extended Search and Opinion dated Sep. 27, 2018, 9 pages.
(Continued)

*Primary Examiner* — Daniel Munoz
*Assistant Examiner* — Bamidele A Jegede
(74) *Attorney, Agent, or Firm* — Lathrop GPM LLP

(57) ABSTRACT

The present disclosure provides an antenna device including a radio frequency transceiving circuit; a matching circuit, electrically coupled to the radio frequency transceiving circuit; and a metal housing, the edge of the metal housing including an arc-shaped section, the metal housing being provided with at least one micro-seam band, the at least one micro-seam band including an arc-shaped part, said arc-shaped part matching the arc-shaped section of the metal housing, the radio frequency transceiving circuit being electrically coupled to the metal housing by means of the matching circuit, such that the metal housing is used as a (Continued)

radiating body of the antenna device, the metal housing being grounded by means of a grounding wire, the grounding wire being provided with an on-off switch configured to control the grounding wire. The present disclosure further provides a mobile terminal.

21 Claims, 3 Drawing Sheets

(51) Int. Cl.
*H01Q 1/50* (2006.01)
*H01Q 23/00* (2006.01)
*H04B 1/48* (2006.01)

(56) References Cited

FOREIGN PATENT DOCUMENTS

| | | | | |
|---|---|---|---|---|
| CN | 105244598 A | | 1/2016 | |
| CN | 105282998 A | * | 1/2016 | ............... H05K 5/00 |
| CN | 105322290 A | | 2/2016 | |

OTHER PUBLICATIONS

European Patent Application No. 17765885.3, Extended Search and Opinion dated Jul. 5, 2019, 6 pages.

* cited by examiner

ANTENNA DEVICE AND MOBILE TERMINAL

CROSS-REFERENCE TO RELATED APPLICATIONS

The present application is a national phase entry under 35 USC § 371 of International Application PCT/CN2017/077163, filed Mar. 18, 2017, which claims the benefit of and priority to Chinese Patent Application No. 201610161254.0, filed Mar. 18, 2016, the entire disclosure of which is incorporated herein by reference.

FIELD

The present disclosure relates to a field of mobile communication technology, and more particularly, to an antenna device and a mobile terminal.

BACKGROUND

An all-metal housing becomes more and more popular among consumers on the market, but considering the limitations of an antenna device, a housing made of a metal and non-metal combination is usually adopted, and the antenna device is located in a non-metal zone to avoid shielding a signal of the antenna device.

A housing of a mobile terminal at present often employs a three-section structure, i.e. a metal zone in the middle of the housing is separated from metal zones at two ends of the housing by an isolation strip filled with a signal non-shielding material. The antenna device is arranged adjacent to the isolation strip to prevent its signal from being shielded. The isolation strip will however be clearly seen by the consumers, affecting the overall appearance of the housing of the mobile terminal.

SUMMARY

The present disclosure aims to provide an antenna device that can guarantee the overall appearance effect of a mobile terminal, and simultaneously prevent a signal of the antenna device from being interfered and increase bandwidth of the antenna device.

In one aspect, the present disclosure provides an antenna device, and the antenna device includes a radio frequency transceiving circuit; a matching circuit, electrically coupled to the radio frequency transceiving circuit; and a metal housing, an edge of the metal housing including an arc-shaped section, the metal housing being provided with at least one micro-seam band, the at least one micro-seam band including an arc-shaped part, the arc-shaped part matching the arc-shaped section of the metal housing, in which the radio frequency transceiving circuit is electrically coupled to the metal housing by means of the matching circuit, such that the metal housing is used as a radiating body of the antenna device, the metal housing is grounded by means of a grounding wire, and the grounding wire is provided with an on-off switch configured to control the grounding wire.

In another aspect, the present disclosure provides an antenna device, and the antenna device includes a radio frequency transceiving circuit; a metal housing, an edge of the metal housing including an arc-shaped section, the metal housing being provided with at least one micro-seam band, the at least one micro-seam band including an arc-shaped part, the arc-shaped part matching the arc-shaped section of the metal housing; and a matching circuit, by means of which the radio frequency transceiving circuit is electrically coupled to the metal housing, such that the metal housing is used as a radiating body of the antenna device, and the matching circuit performs impedance matching and balance matching between the radio frequency transceiving circuit and the metal housing.

The present disclosure further provides a mobile terminal including the above antenna device.

BRIEF DESCRIPTION OF THE DRAWINGS

To describe technical solutions in embodiments of the present disclosure or in the related art more clearly, the following will briefly introduce the accompanying drawings required for the description of the embodiments or the related art. Obviously, the accompanying drawings described below show some embodiments of the present disclosure, and those skilled in the art can obtain other drawings based on these drawings without paying creative efforts.

DETAILED DESCRIPTION

Technical solutions in embodiments of the present disclosure will be clearly and completely described below with reference to the accompanying drawings in the embodiments of the present disclosure. Obviously, the embodiments described herein are only a part but not all of the embodiments of the present disclosure. Based on the embodiments of the present disclosure, all other embodiments obtained by those skilled in the art without paying creative efforts, fall into the protection scope of the present disclosure.

Figure 1:
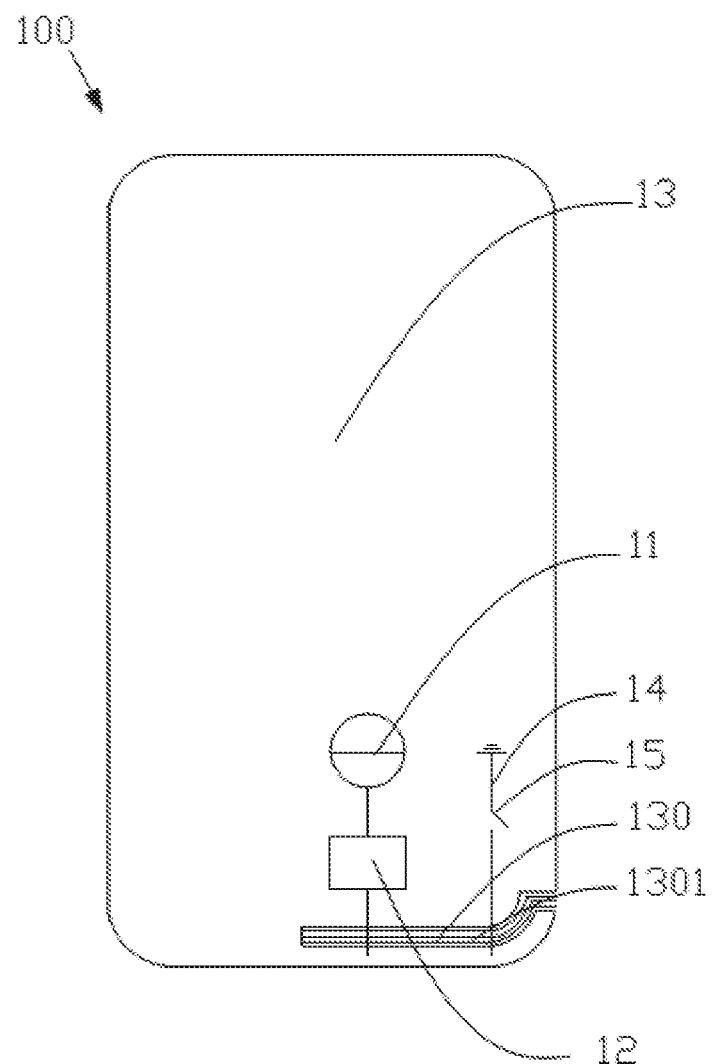
FIG. 1 illustrates a schematic view of an antenna device according to a first embodiment of the present disclosure.

Referring to FIG. 1, an antenna device 100 according to a first embodiment of the present disclosure is illustrated, and the antenna device 100 includes a radio frequency transceiving circuit 11, a matching circuit 12 and a metal housing 13. The radio frequency transceiving circuit 11 is electrically coupled to the metal housing 13 by means of the matching circuit 12, such that the metal housing 13 serves as a radiating body of the antenna device 100. In addition, the metal housing 13 is grounded by means of a grounding wire 14, and the grounding wire 14 is provided with an on-off switch 15 configured to control the grounding wire 14. An edge of the metal housing 13 includes an arc-shaped section, the metal housing 13 is provided with one micro-seam band 130, the micro-seam band 130 includes an arc-shaped part, and the arc-shaped part matches the arc-shaped section of the metal housing 13. The micro-seam band 130 extends non-penetratingly from the edge of the metal housing 13 to the interior of the metal housing 13, such that parts of the metal housing 13 at both sides of the micro-seam band 130 are coupled into a whole, and a micro-seam 1301 in the micro-seam band 130 extends along a short edge of the metal housing 13.

The micro-seam band 130 illustrated in FIG. 1 includes four arc-shaped micro-seams 1301 having a seam width from 0.03 to 0.5 mm. Since the width of the micro-seam 1301 is small enough not to attract attention of a consumer, the integrity of the metal housing 13 can be ensured, and the micro-seam band 130 allows an electromagnetic signal within the metal housing 13 to radiate outwards. Further-more, the arc-shaped micro-seam band 130 increases the length of the micro-seam band, and enhances radiation performance of the antenna structure. Moreover, a distance between two adjacent micro-seams 1301 is larger than the seam width of the micro-seam 1301, a metal strip is formed between the adjacent micro-seams 1301, and the metal strip has the same material as the metal housing 13, such that the integrity of the metal housing 13 can be further ensured in terms of appearance. The micro-seam 1301 is filled with a signal non-shielding material to prevent the electromagnetic signal of the antenna device 100 from being shielded.

It should be noted that three to twenty micro-seams 1301 can be provided in the micro-seam band 130, and the number of the micro-seams 1301 needs to be set according to practical requirements, for example, satisfying an appearance requirement of the metal housing 13 and a radiation condition of the electromagnetic signal of the antenna device 100.

As illustrated in FIG. 1, the radio frequency transceiving circuit 11 is a feed source of the antenna device 100, while the matching circuit 12 serves to perform impedance matching and balance matching between the radio frequency transceiving circuit 11 and the metal housing 13, thereby reducing return loss caused by mismatch so as to ensure normal working of the antenna device 100. In addition, the metal housing 13 is grounded by means of the grounding wire 14, and the grounding wire 14 is provided with the on-off switch 15 configured to control the grounding wire 14. In FIG. 1, when the on-off switch 15 is closed, the metal housing 13 is grounded, and frequency of the electromagnetic signal radiated by the antenna device 100 will change, thereby increasing bandwidth of the antenna device 100.

Figure 2:
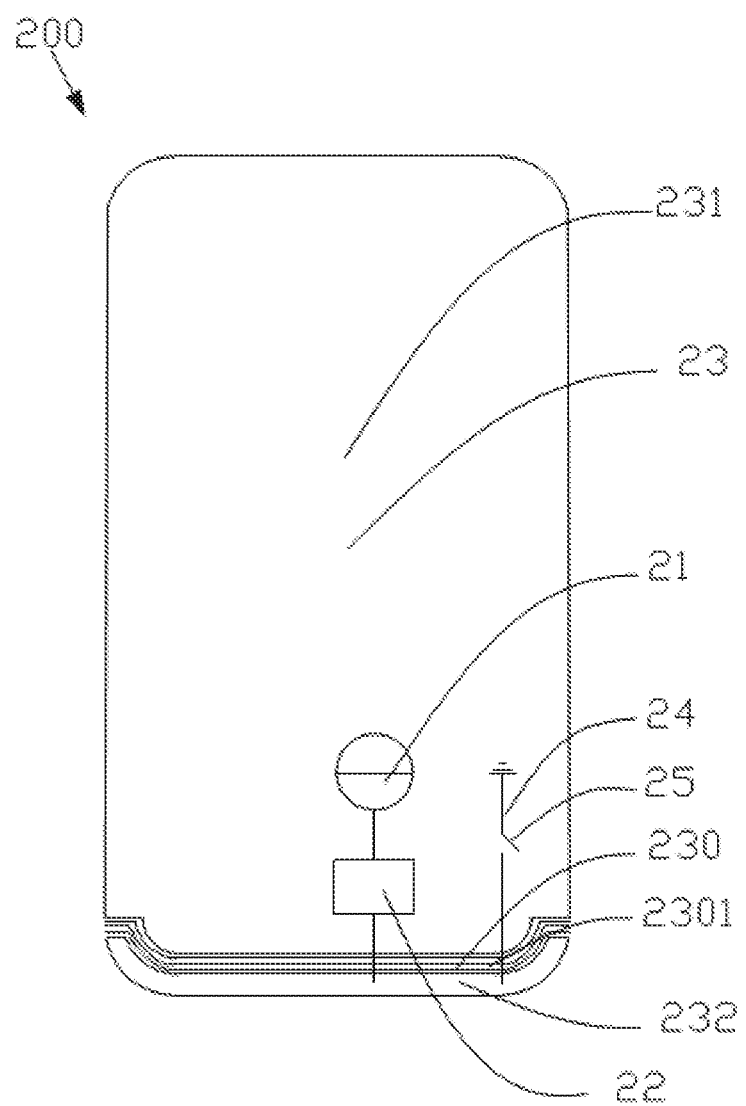
FIG. 2 illustrates a schematic view of an antenna device according to a second embodiment of the present disclosure.

Referring to FIG. 2, an antenna device 200 according to a second embodiment of the present disclosure is illustrated, and one micro-seam band 230 is provided. The number and the seam width of micro-seams 2301 is the same as those of the micro-seams 1301 of the micro-seam band 130 illustrated in FIG. 1. Unlike the antenna device 100 of the first embodiment illustrated in FIG. 1, the micro-seam band 230 extends parallel to the short edge of a metal housing 23 and penetrates through the metal housing 23, such that the metal housing 23 is divided into two independent metal zones 231 and 232, in which, as illustrated in FIG. 2, one metal zone 231 has an area larger than the other metal zone 232. In the antenna device 200, a matching circuit 22 and a grounding wire 24 with an on-off switch 25 are both electrically coupled to the metal zone 232, and in such a case the metal zone 231 can be coupled with the metal zone 232 to radiate an electromagnetic signal outwardly; the grounding wire 24 with the on-off switch 25 can change the frequency of the electromagnetic radiation, thereby increasing bandwidth of the antenna structure 200. Certainly, the matching circuit 22 and the grounding wire 24 can be electrically coupled to the metal zone 231, or the matching circuit 22 and the grounding wire 24 can be electrically coupled to the metal zone 231 and the metal zone 232 correspondingly. When the matching circuit is electrically coupled to one of the metal zone 231 and the metal zone 232, and the grounding wire 24 is electrically coupled to different metal zones, the frequency of the electromagnetic signal that can be transceived by the antenna device 200 may change due to different sizes and structures of the metal zone 231 and the metal zone 231. Thus, it is possible to achieve an effect of frequency selection by coupling the grounding wire 24 to different metal zones, thereby increasing the bandwidth of the antenna device 200.

Figure 3:
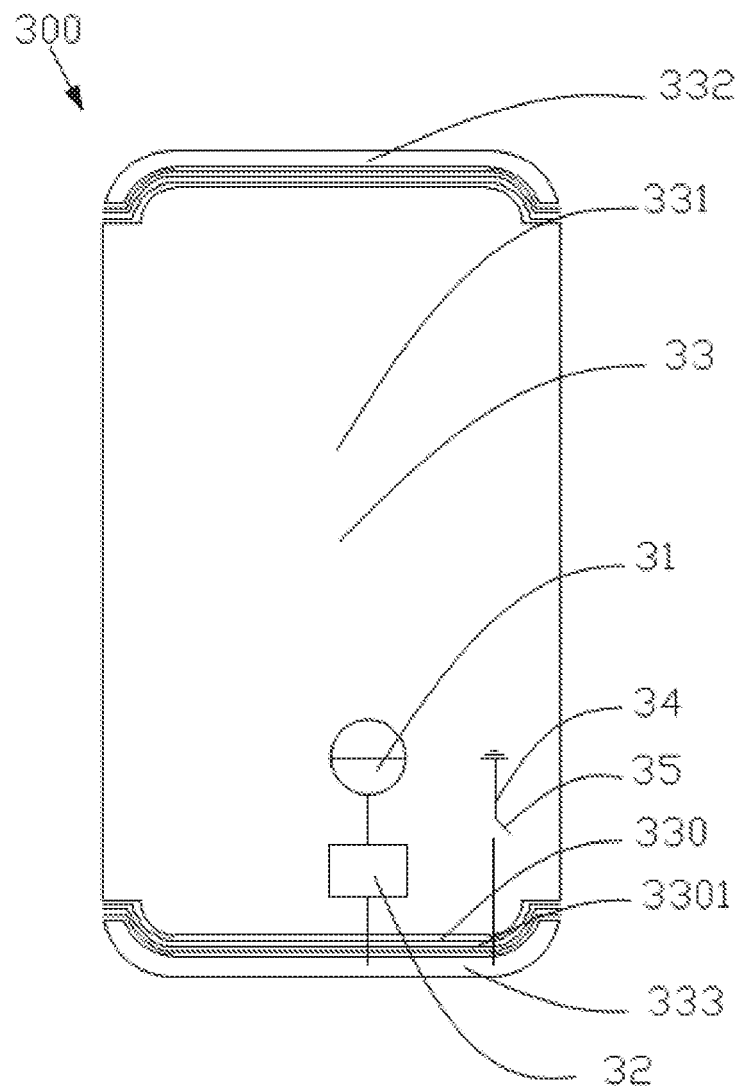
FIG. 3 illustrates a schematic view of an antenna device according to a third embodiment of the present disclosure.

Referring to FIG. 3, an antenna device 300 according to a third embodiment of the present disclosure is illustrated, and two micro-seam bands 330 are provided. The number and the seam width of micro-seams 3301 of each micro-seam band 330 are the same as those of the micro-seams 1301 of the micro-seam band 130 according to the first embodiment illustrated in FIG. 1. The two micro-seam bands 330 divide a metal housing 33 into a first metal zone 331 located in the middle, and a second metal zone 332 and a third metal zone 333 located at two ends of the first metal zone 331, in which, as illustrated in FIG. 3, an area of the first metal zone 331 is larger than an area of the second metal zone 332, and the area of the second metal zone 332 is equal to an area of the third metal zone 333. In the antenna device 300, a matching circuit 32 and a grounding wire 34 with an on-off switch 35 are both electrically coupled to the third metal zone 333, and in such a case the first metal zone 331 and the second metal zone 332 both can be coupled with the third metal zone 333 to radiate the electromagnetic signal outwardly; the grounding wire 34 can change the frequency of the electromagnetic radiation, thereby increasing bandwidth of the antenna structure 300. Certainly, there may be other connections between the matching circuit 32 and the grounding wire 34 with the metal zones. As illustrated in FIG. 3, when the matching circuit 32 is electrically coupled to one of the metal zones, and the grounding wire 34 may be electrically coupled to different metal zones, the frequency of the electromagnetic signal that can be transceived by the antenna device 300 may change due to different sizes, structures and positions of the first metal zone 331, the second metal zone 332 and the third metal zone 333. Thus, it is possible to achieve an effect of frequency selection by coupling the grounding wire 34 to different metal zones, thereby increasing the bandwidth of the antenna device 300.

It should be noted that the micro-seams 1301, 2301 or 3301 can cross with each other. The micro-seam 1301, 2301 or 3301 can also extend throughout or extend partially along a long edge of the metal housing 13, 23 or 33. The specific structure can be determined based on the appearance requirements and particular parameters of the antenna device. The metal housing 13, 23 or 33 can be a front case or a rear cover of a mobile terminal, and can also be a lateral frame of the mobile terminal.

In addition, a radio frequency transceiving circuit 31 and a matching circuit 32 may both be provided within the mobile terminal. The mobile terminal can refer to any computer apparatus used on the move, including but not limited to mobile phones, laptops, tablet computers, POS machines, in-car computers, cameras, etc.

The above only reveals preferred embodiments of the present disclosure, and certainly cannot be used to limit the scope of the present disclosure. Those skilled in the art can understand that all or part of the processes of the above embodiments may be implemented and that equivalent changes based on the claims of the present disclosure still fall into the scope of the present disclosure.

What is claimed is:

1. An antenna device, comprising:
a radio frequency transceiving circuit;
a matching circuit, electrically coupled to the radio frequency transceiving circuit; and
a metal housing, an edge of the metal housing comprising an arc-shaped section, the metal housing being provided with at least one micro-seam band, the at least one micro-seam band comprising a first section and a second section, wherein the first section comprises an arc-shaped part, the arc-shaped part being spaced apart from the edge of the metal housing, and a shape of the arc-shaped part matching a shape of the arc-shaped section of the edge of the metal housing, the second section is placed on two ends of the first section and in straight lines towards lateral sides of the metal housing, wherein the radio frequency transceiving circuit is electrically coupled to the metal housing by means of the matching circuit, such that the metal housing is used as a radiating body of the antenna device, the metal housing is grounded by means of a grounding wire, and the grounding wire is provided with an on-off switch configured to control the grounding wire, wherein the metal housing is rectangular, and the arc-shaped section is formed at a corner of the edge of the rectangular metal housing.

2. The antenna device according to claim 1, wherein the at least one micro-seam band comprises three to twenty micro-seams, and each of the micro-seams has a seam width of 0.03 to 0.5 mm.

3. The antenna device according to claim 2, wherein one micro-seam band is provided and extends non-penetratingly from the edge of the metal housing to an interior of the metal housing, such that parts of the metal housing at both sides of the micro-seam band are coupled into a whole.

4. The antenna device according to claim 3, wherein a distance between two adjacent micro-seams is larger than the seam width of the micro-seam.

5. The antenna device according to claim 4, wherein the micro-seam is filled with a signal non-shielding material.

6. The antenna device according to claim 2, wherein one micro-seam band is provided and divides the metal housing into two independent metal zones, one of the two metal zones is electrically coupled to the matching circuit, and the other of the two metal zones is electrically coupled to the grounding wire.

7. The antenna device according to claim 2, wherein one micro-seam band is provided and divides the metal housing into two independent metal zones, and one of the metal zones is electrically coupled to the matching circuit and the grounding wire.

8. The antenna device according to claim 2, wherein two micro-seam bands are provided, and divide the metal housing into a first metal zone located in the middle, and a second metal zone and a third metal zone located at two ends of the first metal zone, one of the first metal zone, the second metal zone and the third metal zone is electrically coupled to the matching circuit, and another one of the first metal zone, the second metal zone and the third metal zone is electrically coupled to the grounding wire.

9. The antenna device according to claim 2, wherein two micro-seam bands are provided, and divide the metal housing into a first metal zone located in the middle, and a second metal zone and a third metal zone located at two ends of the first metal zone, and one metal zone of the first metal zone, the second metal zone and the third metal zone is electrically coupled to the matching circuit and the grounding wire.

10. The antenna device according to claim 2, wherein the edge of the metal housing comprises a first edge and a second edge adjacent to each other and connected to each other, and the arc-shaped section is formed at a junction of the first edge and the second edge.

11. An antenna device, comprising:
a radio frequency transceiving circuit;
a metal housing, an edge of the metal housing comprising an arc-shaped section, the metal housing being provided with at least one micro-seam band, the at least one micro-seam band comprising a first section and a second section, wherein the first section comprises an arc-shaped part, the arc-shaped part being spaced apart from the edge of the metal housing, and a shape of the arc-shaped part matching a shape of the arc-shaped section of the edge of the metal housing, the second section is placed on two ends of the first section and in straight lines towards lateral sides of the metal housing; and a matching circuit, by means of which the radio frequency transceiving circuit is electrically coupled to the metal housing, such that the metal housing is used as a radiating body of the antenna device, and the matching circuit performs impedance matching and balance matching between the radio frequency transceiving circuit and the metal housing, wherein the metal housing is rectangular, and the arc-shaped section is formed at a corner of the edge of the rectangular metal housing.

12. The antenna device according to claim 11, wherein the metal housing is grounded by means of a grounding wire, and the grounding wire is provided with an on-off switch configured to control the grounding wire.

13. The antenna device according to claim 11, wherein the at least one micro-seam band comprises three to twenty micro-seams, and each of the micro-seams has a seam width of 0.03 to 0.5 mm.

14. The antenna device according to claim 13, wherein one micro-seam band is provided and extends non-penetratingly from the edge of the metal housing to an interior of the metal housing, such that parts of the metal housing at both sides of the micro-seam band are coupled into a whole.

15. The antenna device according to claim 13, wherein one micro-seam band is provided and divides the metal housing into two independent metal zones, one of the two metal zones is electrically coupled to the matching circuit, and the other of the two metal zones is electrically coupled to the grounding wire.

16. The antenna device according to claim 13, wherein one micro-seam band is provided and divides the metal housing into two independent metal zones, and one of the metal zones is electrically coupled to the matching circuit and the grounding wire.

17. The antenna device according to claim 13, wherein two micro-seam bands are provided, and divide the metal housing into a first metal zone located in the middle, and a second metal zone and a third metal zone located at two ends of the first metal zone, one of the first metal zone, the second metal zone and the third metal zone is electrically coupled to the matching circuit, and another one of the first metal zone, the second metal zone and the third metal zone is electrically coupled to the grounding wire.

18. The antenna device according to claim 13, wherein two micro-seam bands are provided, and divide the metal housing into a first metal zone located in the middle, and a second metal zone and a third metal zone located at two ends of the first metal zone, and one metal zone of the first metal zone, the second metal zone and the third metal zone is electrically coupled to the matching circuit and the grounding wire.

19. The antenna device according to claim 13, wherein a metal strip is formed between adjacent micro-seams, and the metal strip has the same material as the metal housing.

20. The antenna device according to claim 19, wherein the micro-seam is filled with a signal non-shielding material.

21. A mobile terminal, comprising an antenna device comprising:
a radio frequency transceiving circuit;
a matching circuit, electrically coupled to the radio frequency transceiving circuit; and a metal casing, an edge of the metal casing comprising an arc-shaped section, the metal casing being provided with at least one micro-seam band, the at least one micro-seam band comprising a first section and a second section, wherein the first section comprises an arc-shaped part, the arc-shaped part being spaced apart from the edge of the metal housing, and a shape of the arc-shaped part matching a shape of the arc-shaped section of the edge of the metal casing, the second section is placed on two ends of the first section and in straight lines towards lateral sides of the metal housing, wherein the radio frequency transceiving circuit is electrically coupled to the metal casing by means of the matching circuit, such that the metal casing is used as a radiator of the antenna device, the metal casing is grounded by means of a grounding wire, and the grounding wire is provided with an on-off switch configured to control the grounding wire, wherein the metal housing is rectangular, and the arc-shaped section is formed at a corner of the edge of the rectangular metal housing.

\* \* \* \* \*